United States Patent
Gu et al.

(10) Patent No.: US 10,994,505 B2
(45) Date of Patent: May 4, 2021

(54) METHOD FOR MANUFACTURING TORIC CONTACT LENSES

(71) Applicant: Novartis AG, Basel (CH)

(72) Inventors: Yeming Gu, Suwanee, GA (US); Curtis Dean McKenney, Duluth, GA (US); Cornelius Daniel Niculas, Suwanee, GA (US)

(73) Assignee: Alcon Inc., Fribourg (CH)

( * ) Notice: Subject to any disclaimer, the term of this patent is extended or adjusted under 35 U.S.C. 154(b) by 232 days.

(21) Appl. No.: 16/217,707

(22) Filed: Dec. 12, 2018

(65) Prior Publication Data

US 2019/0193350 A1   Jun. 27, 2019

Related U.S. Application Data

(60) Provisional application No. 62/608,868, filed on Dec. 21, 2017.

(51) Int. Cl.
| | | |
|---|---|---|
| *B29D 11/00* | (2006.01) | |
| *B29C 33/38* | (2006.01) | |
| *B29K 83/00* | (2006.01) | |

(52) U.S. Cl.
CPC ...... *B29D 11/0048* (2013.01); *B29C 33/3842* (2013.01); *B29D 11/00019* (2013.01); *B29D 11/00038* (2013.01); *B29D 11/00115* (2013.01); *B29D 11/00125* (2013.01); *B29D 11/00134* (2013.01); *B29D 11/00509* (2013.01); *B29D 11/00961* (2013.01); *B29D 11/00182* (2013.01); *B29D 11/00259* (2013.01); *B29K 2083/00* (2013.01)

(58) Field of Classification Search
CPC .......... B29D 11/0048; B29D 11/00115; B29D 11/00134; B29D 11/00019; B29D 11/00961; B29D 11/00038; B29D 11/00125; B29D 11/00509; B29C 33/3842

See application file for complete search history.

(56) References Cited

U.S. PATENT DOCUMENTS

| | | | |
|---|---|---|---|
| 5,611,970 A * | 3/1997 | Apollonio | ............. B29C 33/303 264/2.5 |
| 6,197,227 B1 | 3/2001 | Appleton et al. | |
| 6,669,460 B1 | 12/2003 | Tai et al. | |
| 2011/0266703 A1 | 11/2011 | O'Neill | |
| 2012/0139136 A1 | 6/2012 | Kato | |

FOREIGN PATENT DOCUMENTS

EP    1014154 A1    6/2000

\* cited by examiner

*Primary Examiner* — Mathieu D Vargot
(74) *Attorney, Agent, or Firm* — Sheng-Hsin Hu

(57) ABSTRACT

A method of manufacturing of an astigmatic contact lens having a toric portion and a ballast portion such that said ballast portion causes the toric portion of the contact lens to properly orient in the eye of the wearer. The toric lenses are manufactured by an effective process control method for cylinder axis angle in toric lens production by modifying the target cylinder angle for mold rotation by eliminating the accumulative cylinder axis error from all previous steps including tool making, tool assembly, and molding. The amount modifying the target angle is determined by accurately determine the true cylinder axis on the corresponding mold by using a high-resolution interferometer, such as FISBA FS10M or equivalent models from Trioptics μShape® vertical series.

7 Claims, 4 Drawing Sheets

METHOD FOR MANUFACTURING TORIC CONTACT LENSES

This application claims the benefit under 35 USC § 119(e) of U.S. provisional application No. 62/608,868 filed 21 Dec. 2017, incorporated by reference in its entirety.

This invention relates to a process manufacturing of toric contact lenses. More specifically, the invention relates to the manufacturing of different toric lenses with a good process capability for cylinder axis control.

BACKGROUND OF THE INVENTION

Astigmatism is a defect in the eye that is corrected by a lens with a non-spherical prescription. The prescription, which is usually expressed as cylinder on the patient's prescription order, causes at least a portion of the surface of the lens to have the shape of a toric segment. Hence, such lenses are called toric lenses. Toric contact lenses, which include an optical zone providing a cylindrical correction for patients having certain astigmatic abnormalities. Unlike contact lenses having only a spherical correction, which may generally be placed on the eye in any rotational position, toric lenses are positioned on the patient's eye such that the optical zone's toric axis is aligned with the eye's astigmatic axis.

To maintain a toric contact lens in position, it is well known to provide structure on the contact lens to orient the lens through eyelid blinking movement. For example, the lens may be thinned and/or thickened, for example to provide ballast or slab-off, at various areas so that the eyelid's movement during blinking moves the lens to the correct position. The particular design of this structure is not in and of itself critical to the present invention and is therefore not discussed in greater detail herein. For ease of discussion, all such structure, including slab-off, is generally referred to herein as "ballast." Because the ballast maintains the toric contact lens at a predetermined orientation on the eye, the toric optical zone is formed so that the toric axis is offset from the ballast orientation to align the toric axis with the patient's astigmatic axis. This offset is often defined in increments, for example of 5 degree or 10 degree.

Ballast is typically defined by the outer contact lens curve to prevent discomfort to the eye and to take advantage of eyelid movement. The toric optical zone may be defined on either the front or back lens curve. Depending on the method used to manufacture the lens, however, it may be desirable to define the toric surface on the back curve.

The lens is formed by a cast molding process, a monomer is typically deposited in a cavity between two mold halves that are themselves formed by injection molding. Each mold half defines an optical surface that forms either the front lens curve or the back lens curve. These optical surfaces are, in turn, formed by optical tools disposed in the mold cavity of an injection molding machine. Optical tools used to make toric lens molds therefore define the toric optical zone and ballast that are imparted to the mold halves. If the ballast and the toric optical zones are formed on the same lens surface, the optical tool forming that surface would define both characteristics. Thus, for given ballast and toric zone designs, a separate optical tool is required for every offset angle.

To reduce the number of required optical tools, the ballast and the toric zone may therefore be defined on opposite contact lens surfaces, and therefore on opposite lens mold halves. For instance, the ballast may be defined by the front curve mold half while the toric optical zone is defined by the back curve mold half. Accordingly, the resulting mold halves may be rotated with respect to each other to achieve a desired offset angle. Toric lenses have to meet a tight tolerance range for cylinder axis (±5°). Poor process capability for cylinder axis control produces toric lenses having high process variation in cylinder axis and can cause significant yield loss in production. This significant yield loss makes toric lenses manufacturing more expensive.

Hence, for reasons of efficiency and cost-effectiveness, there is a continuing need for improving process capability for cylinder axis control.

SUMMARY OF THE INVENTION

The invention is related to a method for manufacturing a toric contact lens, the method comprising the steps of:
a. injection molding to form an anterior mold section and a posterior mold section, wherein the posterior mold section or the anterior mold section has a toric portion and the other mold section has a prism ballast, wherein each mold has a tab or other locating features for facilitating a determination of orientation of the mold,
b. measuring a cylinder axis angle error of the mold section having the toric portion by an interferometer apparatus, wherein the cylinder axis angle error is defined as a difference of measured cylinder axis angle by the interferometer apparatus and a reference cylinder axis angle defined by the tab position or other locating features,
c. rotating one of the mold sections by an amount of a target axis angle subtracting the cylinder axis angle error, while the other molding section is not rotated,
d. introducing a lens forming material into the lens shaped cavity after step c of rotating one of the mold,
e. assembling the anterior mold section and the posterior mold section to form a lens shaped cavity there between,
f. curing the lens forming material in the lens shape cavity to form the toric lens.
The method may further comprises a step of (g) repeating the steps c to f to consume all molds within a batch.

DETAILED DESCRIPTION OF AN EMBODIMENT OF THE INVENTION

Figure 1:
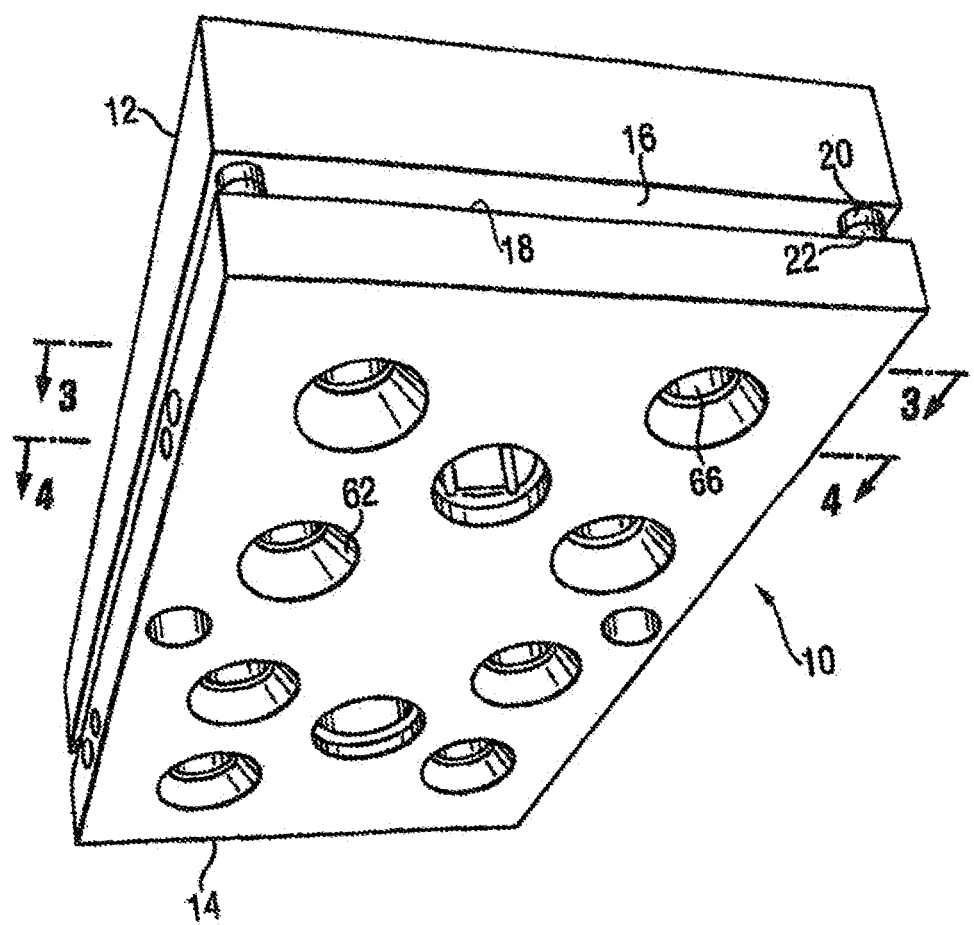
FIG. 1 is a perspective view of a lens mold carrier constructed in accordance with an embodiment of the present invention.

The invention is related to a method for manufacturing a toric contact lens, the method comprising the steps of:
a. injection molding to form an anterior mold section and a posterior mold section, wherein the posterior mold section or the anterior mold section has a toric portion and the other mold section has a prism ballast, wherein each mold has a tab or other locating features for facilitating a determination of orientation of the mold, b. measuring a cylinder axis angle error of the mold section having the toric portion by an interferometer apparatus, wherein the cylinder axis angle error is defined as a difference of measured cylinder axis angle by the interferometer apparatus and a reference cylinder axis angle defined by the tab position or other locating features, c. rotating one of the mold sections by an amount of a target axis angle subtracting the cylinder axis angle error, while the other molding section is not rotated, d. introducing a lens forming material into the lens shaped cavity after step c of rotating one of the mold, e. assembling the anterior mold section and the posterior mold section to form a lens shaped cavity there between, f. curing the lens forming material in the lens shape cavity to form the toric lens.

The above method may further comprises a step of (g) repeating the steps c to f to consume all molds within a batch.

Lens molds for making contact lenses are well known to a person skilled in the art and, for example, are employed in cast molding or spin casting. Methods of manufacturing mold sections for cast-molding a contact lens are generally well known to those of ordinary skill in the art. The process of the present invention is not limited to any particular method of forming a mold. In fact, any method of forming a mold can be used in the present invention. The preferred method of making the molds of the invention is by injection molding using known techniques, but the molds could be made by other techniques such as lathing, diamond turning, or laser cutting for manufacturing glass mold or quartz mold.

Prior to the cast molding of the contact lens, each of the mold sections is formed by injection molding a resin in the cavity of an injection molding apparatus. Tools or tooling inserts are used for cast molding a posterior surface and an anterior surface of a toric lens. The tooling inserts are adapted to be placed in molding apparatus to form a first mold section and a second mold section, each having a negative impression of a surface of the respective tooling insert. The surfaces of the inserts are substantially smooth surfaces corresponding to a desired toric contact lens posterior surface or anterior surface. The mold sections are typically used only once for casting a lens, the injection molding tools are used to make multiple of molds. The tools must be manufactured to extremely high specifications so that no roughness or surface defects are transferred to the mold section being made therefrom, as any such defects on the mold surface would be transferred to the molded contact lens. The tools are typically made from aluminum alloys, brass, stainless steel, nickel or other materials suitable for optical surfaces fabrication. After machining the desired surface on the tools, the tools are typically polished to achieve precision surface quality so that no surface imperfections are transferred to the mold section being injection molded therefrom.

The tool for the injection molding of the posterior mold section has a concave toric surface for forming the toric surface on the posterior mold section and the tool for the injection molding of the anterior mold section has a convex surface for forming a prism ballast surface on the anterior mold section. According to the invention, the tool for the injection molding of the posterior mold section may has a concave surface for forming the prism ballast surface on the posterior mold section and the tool for the injection molding of the anterior mold section may has a convex toric surface for forming a toric surface on the anterior mold section. According to further variations of the described embodiments, both the anterior and posterior mold sections may include detectable indicia at a known position on the mold sections.

In general, a mold comprises at least two mold sections (or portions) or mold halves, i.e. male and female mold halves. The male mold half defines a first molding (or optical) surface defining the posterior (concave) surface of a lens and the second mold half defines a second molding (or optical) surface defining the anterior (convex) surface of a lens. The first and second mold halves are configured to receive each other such that a lens forming cavity is formed between the first molding surface and the second molding surface. The molding surface of a mold half is the cavity-forming surface of the mold and in direct contact with lens-forming material.

Virtually all materials known in the art for making molds can be used to make molds for making toric contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used.

The mold sections or halves are assembled together to form an assembled mold which defines a lens-shaped cavity. A polymerizable/curable monomer composition is placed in the cavity and is processed, e.g., polymerized and/or cured, to form a contact lens. The lens is demolded and may be subjected to conventional additional processing steps, such as extraction, sterilization, packaging and the like.

Contact lenses having a toric optical zone (commonly referred to as "toric contact lenses") are commonly used to correct refractive abnormalities of the eye relating to astigmatism. Astigmatism may be associated with other refractive abnormalities, such as myopia (nearsightedness), and hyperopia (farsightedness), presbyopia and the like. Toric contact lenses can be prescribed with one or more spherical corrections. Spherical contact lenses may freely rotate on the eye, toric contact lenses typically include a ballast, or a thickened lens section, to inhibit rotation of the lens on the eye such that the cylindrical axis of the toric zone remains generally aligned with the axis of the astigmatism. The ballast provides an asymmetric component to the lens that can be addressed by the present invention.

The anterior mold section and the posterior mold section can be assembled to form a lens shaped cavity there between with the lens mold carriers embodied in the manner in U.S. Pat. No. 666946. The advantage of assembly is to hold the mold halves during the lens-forming process and rotating the halves with respect to each other to achieve a desired rotational offset between them. However, the use of lens mold carriers as described here is only served as an example. The present invention is also is applicable to other means of holding the two molds together, for example, the molds are not kept together in a carrier but similar to the use of carriers the 2 molds are rotated and assembled together, then mold assemblies are placed on trays into the curing oven.

One embodiment of such a lens mold carrier is described in following with the aid of FIGS. 1 to 6.

Referring to FIG. 1, a lens mold carrier 10 includes a first frame 12 and a second frame 14. First frame 12 and second frame 14 define respective front surfaces 16 and 18 that oppose each other in the operative position of carrier 10 illustrated in FIG. 1. Surfaces 16 and 18 are substantially planar. That is, despite the presence of holes in the surfaces, the surfaces are otherwise flat. Minor variations may be provided in the surfaces in this embodiment as long as they do not prevent placement of the plates in the operative position. Four pairs of opposing rest buttons 20 and 22 are disposed at the corners of frames 12 and 14 to maintain a predetermined distance between the frames in the operative position.

As illustrated in the figures and discussed herein, frames 12 and 14 comprise solid plates having cavities therein to house other components. It should be understood, however, that this is for illustrative purposes only and that other suitable frame constructions may be employed within the present invention. For example, frames may be relatively open structures with open front surfaces. Clips, rings or other structures may be provided within the frames to hold the other components in position. Further, the front surfaces need not be substantially planer as shown in the present figures. They may be constructed in any suitable manner so that the mold halves may be properly oriented.

Frames 12 and 14 may be held and transported within an automated process for manufacturing contact lenses. During the lens molding step, the frames are moved to the operative position shown in FIGS. 1, 3 and 4. This movement is relative. That is, the frames are moved together relative to each other. With respect to a machine holding and transporting the frames, however, one frame may be held stationary while the other is moved. It should be understood that this nevertheless defines relative movement between the frames.

Figure 2:
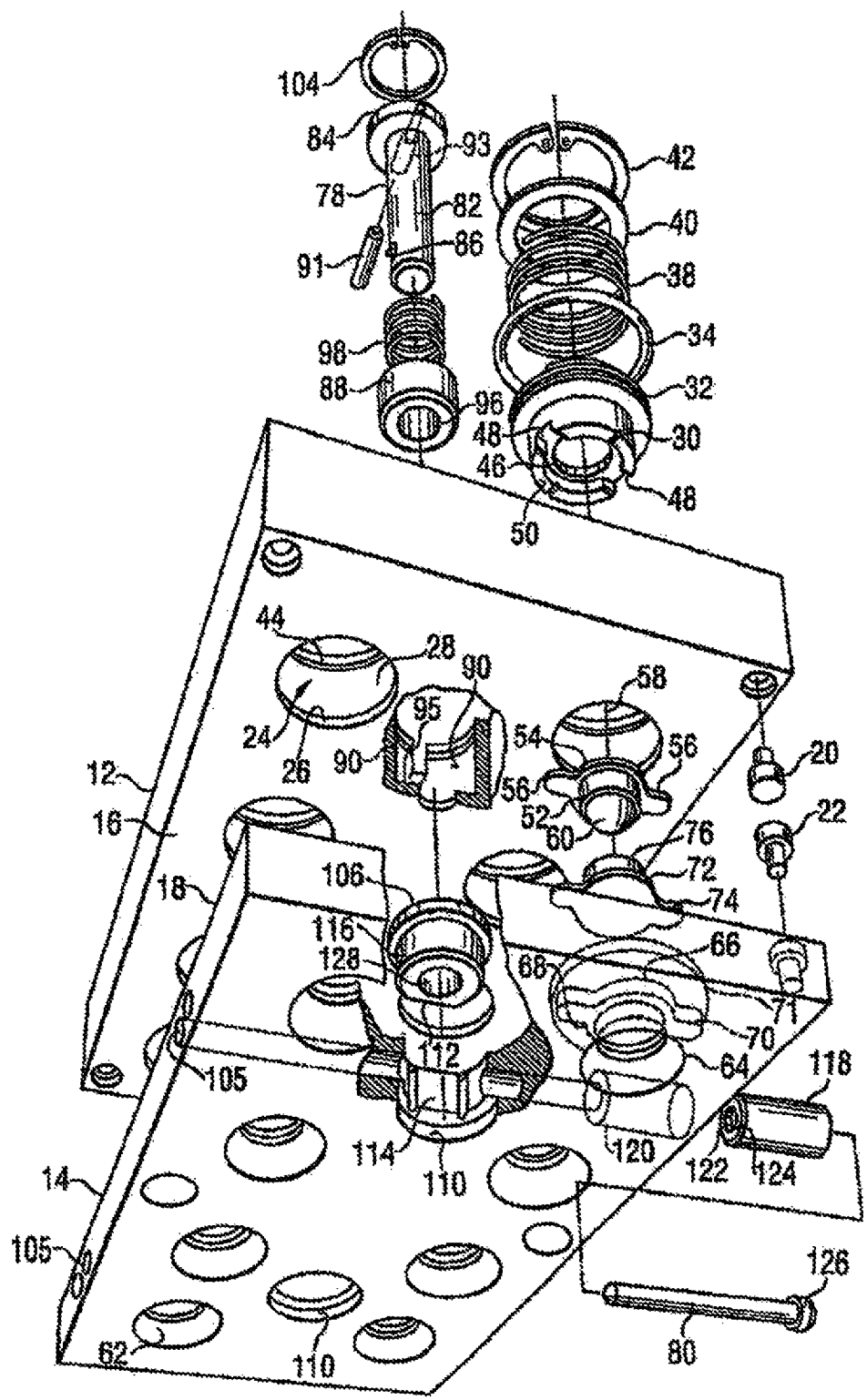
FIG. 2 is an exploded view of the carrier shown in FIG. 1.

Referring to FIG. 2, first frame 12 defines eight holes 24 extending through the plate and opening to front surface 16. An annular shoulder 26 extends radially inward from the inner circumferential surface 28 of each hole 24. In this embodiment, annular shoulder 26 is adjacent front surface 16 so that the front surface includes one side of the shoulder. It should be understood, however, that the shoulder may be disposed further within the hole as appropriate for other suitable constructions. In addition, while annular shoulder 26 extends continuously about hole 24, it should be understood that the shoulder may be defined by discontinuous sections.

Figure 6:
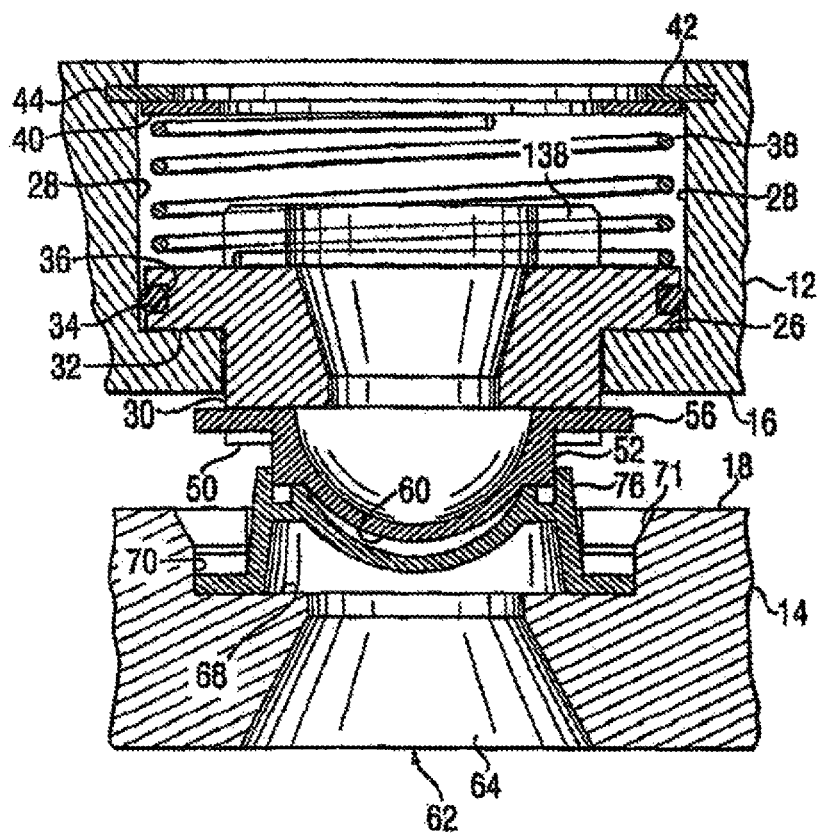
FIG. 6 is a partial cross-sectional view of a lens mold carrier in accordance with an embodiment of the present invention.

Each hole 24 receives a holder assembly including a generally cylindrical holding member 30 having an annular shoulder 32 at the base thereof. Referring also to FIG. 6, an O-ring 34 is received within a channel 36 of shoulder 32. A coil spring 38 bears on one side against holding member 30 and on the opposite side against a washer 40. Washer 40 sits on lock ring 42 received in an annular groove 44 defined in surface 28. Because lock ring 42 is axially secured to plate 12 with respect to the axis of hole 24, spring 38 bears on frame 12 to bias holding member 30 toward front surface 16 so that shoulder 32 engages shoulder 26. In the illustrated embodiment, shoulder 32 abuts the opposing surface of shoulder 26. It should be understood, however, that the holding member may engage shoulder 26 through another component, for example an annular flange surrounding a lens mold half. In a preferred embodiment, holding member 30 and plate 12 are constructed from steel, and spring 38 is a coil spring of sufficient length so that between about 10 and about 15 pounds of pressure is applied to the holding member.

Holding member 30 also defines a recess 46 defining a circular central portion and two outer channels 48 extending through a rim 50. Recess 46 receives a lens mold half 52 defining an annular flange 54 and tabs 56 extending therefrom. Tabs 56 of the lens mold half 52 are received in outer channels 48 (with approximately 0.003 inches clearance in one preferred embodiment) so that mold half 52 is held in and rotatable with holding member 30 with respect to an axis 58 of hole 24.

In the figures, frame 12 is shown as the top frame. Holding member 30 holds base curve mold half 52, which defines a convex optical surface 60. It should be understood, however, that the position of the frames may be reversed and that, moreover, holding member 30 may be used to secure either the front mold half or the base curve mold half.

Referring again to FIGS. 1, 2 and 6, second frame 14 includes a plurality of holes 62 disposed in an arrangement corresponding to the disposition of holes 24 in first plate 12 so that when frames 12 and 14 are aligned in the operative position shown in FIG. 1, the corresponding mold halves of each lens mold oppose each other. Each hole 62 includes a cylindrical portion 66 and a frustoconical counterbore portion 64, thereby forming an annular shoulder 68. Cylindrical portion 66 opens into side slots 70 which, along with cylindrical portion 66, open to front surface 18 through a frustoconical bore section 71. Cylindrical section 66 and tabs 70 are shaped to receive an annular flange 72 and tabs 74 of a second mold half 76 so that mold half 76 is rotationally fixed within hole 62 with respect to axis 58. That is, mold half 76 does not rotate about axis 58 with respect to frame 14.

Referring to FIG. 2, a latch mechanism to hold frame 12 and frame 14 in the operative position shown in FIG. 1 includes a king pin 78 and a lock pin 80. King pin 78 includes an elongated shaft portion 82 and a cylindrical cap 84 at one end of the shaft. A transverse hole 86 extends through the shaft end opposite the cap.

Figure 4:
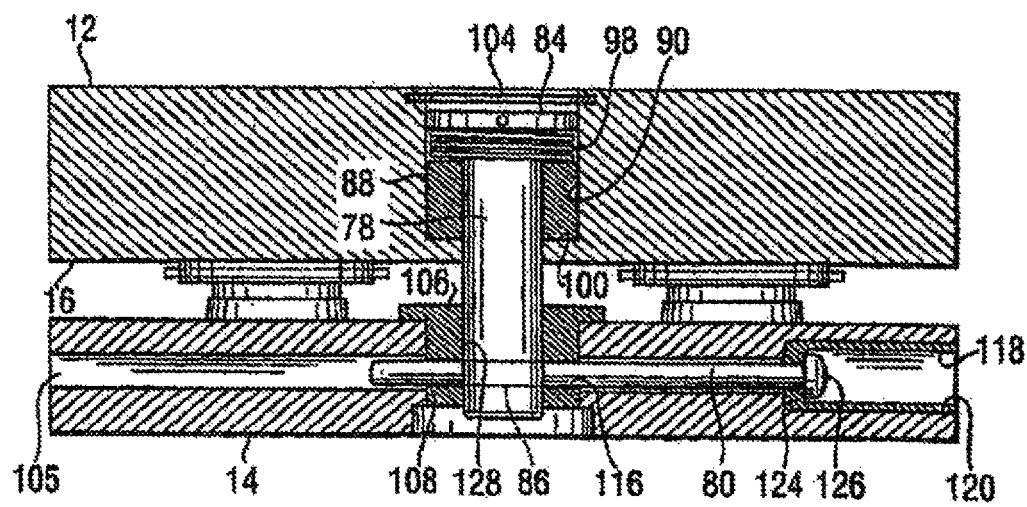
FIG. 4 is a cross-sectional view taken along the line 4-4 shown in FIG. 1.

A bushing 88 is press fit in a hole 90 in plate 12. A bore 96 receives the shaft portion of king pin 78. To rotationally secure king pin 78 with respect to frame 12, and therefore with respect to frame 14 when the frames are in the operative position shown in FIG. 1, a pin 91 is received in a counterbore 93 in cap 84 so that pin 91 extends radially from the cap and is received in a slot 95 extending radially outward from hole 90. Referring also to FIG. 4, a spring 98 bears on one side against bushing 88 and on the opposite side against cap 84. Bushing 88 abuts a shoulder 100 formed by a counterbore formed in hole 90. Thus, spring 98 biases king pin 78 away from frame 14 and lock pin 80. A lock ring 104 retains king pin 78 within frame 12.

Lock pin 80 is received in a bore 105 extending through the width of frame 14. A bushing 106 is press fit in a bore 108 extending through frame 14 and intersecting bore 105. Bushing 106 includes a flat side 112 that mates with an opposing flat 114 in bore 110 to rotationally align the bushing. Bushing 106 includes a through hole 116 that is slightly larger than the diameter of lock pin 80 and that aligns with bore 105 and an axial bore 128 that aligns with bore 96 of bushing 88 when frames 12 and 14 are in the operative position.

A bushing 118 is press fit in a counterbore portion 120 of bore 105. Bushing 118 defines a hole 122 in an end 124 thereof so that hole 122 axially aligns lock pin 80 in bore 105 and so that an end cap 126 of pin 80 abuts end surface 124 to limit the axial passage of pin 80 in bore 105.

For purpose of clarity, only one latch mechanism and one lens mold half holder assembly are illustrated in FIG. 2. It should be understood, however, that a holder assembly is provided for each hole 24 and that a latch mechanism is received in each of two pair of bores 90 and 110. Accordingly, carrier 10 may be used to simultaneously form eight contact lenses using eight contact lens mold assemblies.

Figure 3:
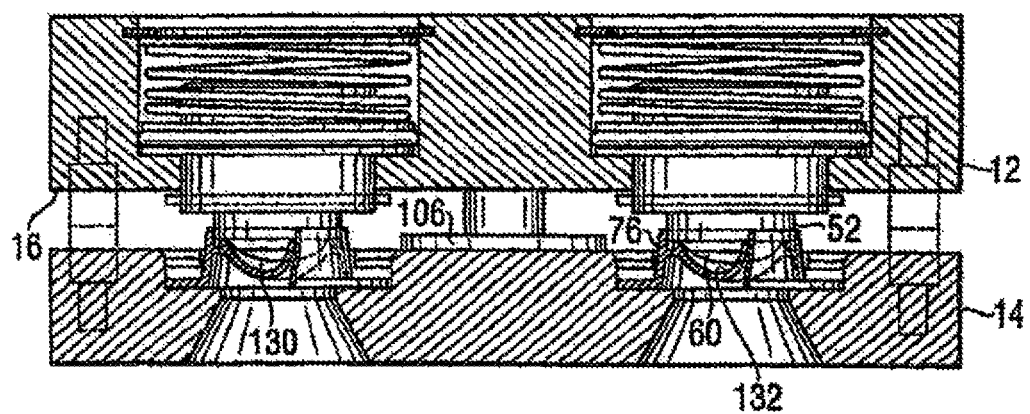
FIG. 3 is a cross-sectional view taken along the line 3-3 shown in FIG. 1.

As noted above, and referring more particularly to FIGS. 3 and 6, frame 12 rotationally secures lens mold half 52 so that its optical surface 60 faces outward from front surface 16. As shown in the illustrated embodiment, mold half 52 is held by holding member 30 slightly outward from front surface 16. As frame 14 is brought toward front surface 16, mold half 76 and mold half 52 engage each other as shown in FIG. 3 to form a lens molding cavity 130 between optical surface 60 and an optical surface 132 of mold half 76. A monomer mixture is deposited in concave surface 132 prior to bringing frames 12 and 14 together, and cavity 130 forms the monomer into the shape of a contact lens.

It should be understood that the mold halves may be placed in various suitable positions in or on the frames as long as the frames may be put together so that the mold halves engage to form the lens cavity. For example, frame 14 may be constructed so that a holding member holds mold half 76 within hole 62 so that optical surface 132 is below front surface 18 with respect to frame 12. Mold half 52 and/or frame 12 is constructed in such an embodiment so that optical surface 60 extends into hole 62 to oppose optical surface 132.

As noted above, front curve mold halves 76 are held in a rotationally fixed position with respect to frames 12 and 14 while the base curve mold halves 52 are rotatable with their respective holding members 30 with respect to the frames. Assuming that the front curve mold halves define the lens ballast and that the base curve mold halves define the toric or multifocal lens characteristics, the holding members 30 may be rotated as needed to achieve a desired offset between the toric or multifocal axis and the ballast in each mold pair.

Initially, all holding members 30 may be aligned in a uniform, predetermined rotational position with respect to frame 12 to receive mold halves 52. This may be desirable in a system in which an automated transfer device removes the mold halves from an injection molding machine and places them directly into the carrier in a certain orientation. A similar transfer device may place front curve mold halves 76 into frame 14. Once the mold halves are in the frames, the system then rotates each mold half 52 to achieve a desired offset between its toric or multifocal axis and the ballast of its opposing front curve mold half.

The present invention may be used within a variety of molding systems. In the present embodiment, only mold halves 52 are rotated as needed to achieve a desired offset between the toric axis and the ballast, and rotatable holder assemblies 30 are therefore provided only in frame 12. It should be understood, however, that frame 14 could also include rotatable holder assemblies so that the front curve molds are rotatable. In such an embodiment, frame 14 would have a construction similar to that of frame 12 with respect to the holder assemblies.

Once the mold halves are properly oriented, frame 14 is moved to a dispensing station at which monomer is injected into the mold half front curves. A suction device is then brought to the bottom of frame 12 and applies suction to holes 24 (FIG. 2) to retain mold halves 52 in frame 12 as the frame is inverted and moved to a position above frame 14. The frame is then placed down onto frame 14 so that the frames may be attached as described in more detail below.

As noted above, mold halves 52 may be rotated prior to assembly of the frames to achieve the desired optical axis/ballast offset. However, the mold halves may instead be rotated after assembly. In either case, the molds may be rotated in a similar manner as will now be described with reference to the embodiment shown in FIGS. 3 and 6.

A frictional engagement between O-ring 34 and surface 28 must be overcome before holding member 30, and therefore mold half 52, rotates with respect to frame 12 about axis 58 (FIG. 2). O-ring 34 is preferably made of a flexible polymer or elastomer, such as a polyamide, polyester or flouropolymer elastomer. Its construction, and the construction of hole 24 and the holder assembly, are chosen such that this threshold rotational force necessary to rotate holding member 30 with respect to frame 12 is greater than rotational forces that may be reasonably expected between the-holding member and frame 12 during movement of carrier 10 after the lens molds are placed in the carrier and during the lens casting process.

Figure 5:
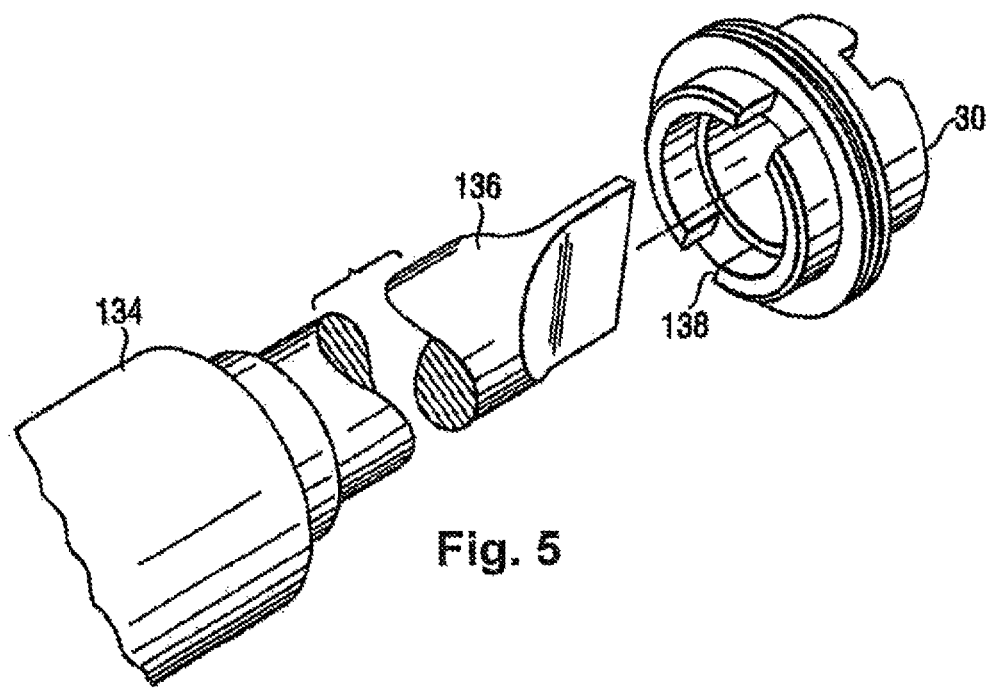
FIG. 5 is a partial perspective view of an adjusting tool for rotating a holder assembly within a lens mold carrier in accordance with an embodiment of the present invention.

The threshold rotational force nevertheless permits rotation of holding member 30 by application of torque to holding member 30 by manual or mechanical means, for example by a tool 134 shown in FIG. 5 that is operated automatically by the cast molding machine. The cast molding machine inserts tool 134 into bore 24 through lock ring 42, washer 40 and spring 38 until a screw driver tip 136 is inserted within a slot 138 in holding member 30. The machine then rotates tool 134 until lens mold half 52 is rotated about axis 58 (FIG. 2) to a desired rotational position with respect to mold half 76. Lens mold half 52 may thus be placed in any of a plurality of rotational positions so that the optical surface 60 cylindrical axis may be offset from the ballast provided by optical surface 132 to the desired degree. The tool is then withdrawn from bore 24.

Referring to FIGS. 3 and 4, prior to the point when frames 12 and 14 are brought together so that the mold halves engage one another to form lens mold cavity 130, king pin 78 and lock pin 80 are not engaged, and spring 98 biases cap 84 upward to engage lock ring 104 so that through hole 86 does not align with bore 105. Lock pin 80 is not inserted in bore 105. Once the frames are brought together in the operative position shown in FIGS. 1 and 3, however, the cast molding machine inserts a tool into bore 90 from the rear side of frame 12, engaging cap 84 and pushing king pin 78 forward against the bias of spring 98 until hole 86 aligns with bore 105. A light and light receiver may be placed at opposite sides of bore 105 to confirm that hole 86 is aligned with the bore. A second tool 184 holds lock pin 80. When the bore and hole are aligned, the machine inserts this tool into the right hand opening of bore 105 to push lock pin 80 to the left until it passes through hole 86 and end cap 126 abuts end surface 124. The first tool is then withdrawn from bore 90, causing spring 98 to push upward against king pin 78, thereby holding lock pin 80 between king pin 78 and bushing 106 as shown in FIG. 4. The second tool is then removed from bore 105. In the operative position of frames 12 and 14, suction is not required to maintain mold halves 52 in frame 12, and is therefore no longer applied.

When the frames are latched together, carrier 10 may be moved as a unit to later processing stages for ultraviolet or thermal curing. After a suitable curing period, for example approximately thirty minutes, the assembled frames may be moved to another station or facility for finishing of the cured lenses. To disassemble the frames, a tool is inserted into bore 90 to push king pin 78 downward against the bias of spring 98. This releases the hold on lock pin 80 between king pin 78 and bushing 106. A tool is then inserted into the left hand side of bore 105 and pushes lock pin 80 to the right until it clears hole 86. The tool is then removed from bore 90 so that king pin 78 returns to its initial position. The frames may then be separated so that the cured contact lenses formed in the cavities 130 (FIG. 3) of the eight lens molds carried by carrier 10 may be removed.

During subsequent disassembly of carrier 10, for example for cleaning or repair, it may be desirable to confirm that lock pin 80 has been removed from bore 105. In an automated process, a light source emits light into one side of bore 105. A light detector disposed at the other end of the bore receives this light to ensure that the bore is clear.

Further details of lens carrier, it is referred to the description of the afore-mentioned U.S. Pat. No. 666,946. The embodiment of lens mold carrier can be used in the production line.

It is found that in process control of toric contact lens to meet the target contact lens diameter, base curve equivalent, center thickness, sphere power, cylinder axis angle and cylinder power, cylinder axis angle has a higher process variation than the other parameters. Toric lenses (contact lenses for astigmatism) have to meet a tight tolerance range for cylinder axis (±5°). Poor process capability for cylinder axis can cause significant yield loss in production. Root causes for high cylinder axis angle's variation is due to no direct measurements of cylinder axis in tool and mold sections and results in ineffective in-process control. It is also found that the cylinder axis angle error is caused by the accumulation of mechanical tolerance and other process variations from tool making, tool assembly, to mold distortion caused by imperfections in the molding process. One of the major source for accumulative cylinder axis angle error is the stack up of mechanical alignment error of tool assembly during the molding process: the rotation control of tool inserts in core pins, core pin in mold base, etc. Typically, the rotational control of tools is with a small flat on the stem of the tool inserts, and the relatively small diameter of the stem poses a challenge for accurate angular control. A conventional process control adopts various in-process control steps in tool making, mold measurement with machine vision apparatus, mold rotation control with real-time machine vision feedback. However, all these steps are dependent on the assumption that the true cylinder optics is aligned with mechanical markings on the molds. All the conventional in-process control steps process are dependent on the assumption that the true cylinder optics is aligned with mechanical markings on the molds. Therefore these steps became ineffective when the true cylinder optics is not accurately aligned with the mechanical markings.

The present invention is partly based on the findings that an effective process control method for cylinder axis angle in toric lens production can be achieved by modifying the target angle for mold rotation by eliminating the accumulative cylinder axis error from all previous steps including tool making, tool assembly, and molding. This is an effective process control strategy because the last step of cylinder axis control is the active rotation control of one of the molds. The key is to accurately determine the true cylinder axis error on the corresponding mold (e.g., BC mold). The key is to be able to accurately determine the true cylinder axis error on the corresponding mold (e.g., BC mold). A high-resolution interferometer, such as FISBA FS10M or equivalent models from Trioptics μShape® vertical series, provides a convenient method for this task. The high-resolution interferometer, such as FISBA FS10M or equivalent models from Trioptics μShape® vertical series can directly and actually measure the true cylinder axis on the mold section having toric portion. This discovery provides a method for a simple in-process control step to overcome accumulative process error from all upstream process steps and tighten the process control of cylinder axis on toric lens production. The accumulative cylinder axis error from all upstream process steps can be determined by measuring a cylinder axis angle error of the posterior mold (BC) section by an interferometer apparatus, wherein the cylinder axis angle error is defined as a difference of measured cylinder axis angle by the interferometer apparatus and a reference cylinder axis angle defined by the tab position. In order to eliminate the accumulative process error from all upstream, rotating one of the mold sections by an amount of a target cylinder axis angle subtracting the cylinder axis angle error, while the other molding section is not rotated or remained at the default orientation. The default orientation is the natural orientation defined by the default tab position of the mold. This position is determined by the design of the carrier or whatever holding device being used to hold the mold. The cylinder axis angular error only needs to be measured and calculated once for each batch of mold or a given molding run, taking advantage of the fact that and cylinder axis error is not expected to vary within a molding run. Therefore, the production process can simply repeat the step of introducing a lens forming material into the lens shaped cavity and step of curing the lens forming material in the lens shape cavity to form the toric lens until to consume all molds within a batch.

When the mold section is measured for true cylinder axis angle of the mold section, a measurement device such as an interferometer and the like can be used. One example of an interferometer useful in measuring the true cylinder axis angle is the μPhase® Vertical series interferometers, which is commercially available from TRIOPTICS GmbH.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can be a prepolymer, a mixture of prepolymers, a mixture of monomers, or a mixture of one or more prepolymers and one or more monomers and/or macromers. It should be understood that any silicone-containing prepolymers or any silicone-free prepolymers can be used in the present invention. According to the present invention, the fluid lens-forming composition preferably comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof. A polymerizable/curable lens forming material composition is placed in the female mold after The mold sections or halves are assembled together to form an assembled mold which defines a lens-shaped cavity. and is processed, e.g., polymerized and/or cured by ultraviolet curing or thermal curing, to form a contact lens. The lens is demolded and may be subjected to conventional additional processing steps, such as extraction, sterilization, packaging and the like.

What is claimed is:

1. A method for manufacturing a toric contact lens, the method comprising the steps of:
    a. Injection molding to form an anterior mold section and a posterior mold section, wherein the posterior mold section or the anterior mold section has a toric portion and the other mold section has a prism ballast, wherein each mold has a tab or other locating features for facilitating a determination of orientation of the mold, b. measuring a cylinder axis angle error of the mold section having the toric portion by an interferometer apparatus, wherein the cylinder axis angle error is defined as a difference of measured cylinder axis angle by the interferometer apparatus and a reference cylinder axis angle defined by the tab position or other locating features, c. determining an actual amount of rotation angle by subtracting the cylinder axis angle error from a target axis angle, d. rotating one of the mold sections by the actual amount of rotation angle, while the other molding section is not rotated, e. introducing a lens forming material into the mold section being rotated or the other mold section being not rotated after step d of rotating one of the mold sections, f. assembling the anterior mold section and the posterior mold section to form a lens shaped cavity there between, g. curing the lens forming material in the lens shape cavity to form the toric lens.

2. The method of claim 1, further comprising a step of repeating the steps d to g to finish a manufacturing batch.

3. The method of claim 1, wherein the posterior mold section has the toric portion and the anterior mold section has the prism ballast.

4. The method of claim 1, wherein the anterior mold section has the toric portion and the posterior mold section has the prism ballast.

5. The method of claim 1, wherein the lens forming material comprises at least one member selected from the group consisting of a hydrophilic vinylic monomer, a silicone containing vinylic monomer, a silicone-containing prepolymer, a hydrophilic prepolymer free of silicone, and combinations thereof.

6. The method of claim 1, wherein the curing step is performed by an ultraviolet curing.

7. The method of claim 1, wherein the curing step is performed by a thermal curing.

* * * * *